United States Patent [19]

Matsumoto et al.

[11] Patent Number: 5,457,791
[45] Date of Patent: Oct. 10, 1995

[54] STORAGE SYSTEM AND METHOD OF CONTROL

[75] Inventors: Yoshiko Matsumoto; Hisashi Takamatsu; Hisaharu Takeuchi; Yoshihiro Uchiyama; Mamoru Tohchi; Hisayoshi Kawabata, all of Odawara; Takao Sato, Sagamihara, all of Japan

[73] Assignee: Hitachi, Ltd., Tokyo, Japan

[21] Appl. No.: 57,812

[22] Filed: May 7, 1993

[30] Foreign Application Priority Data

May 7, 1992 [JP] Japan .................................. 4-113829

[51] Int. Cl.$^6$ .................................................. G06F 11/00
[52] U.S. Cl. ................................... 395/182.03; 371/10.2; 371/40.4
[58] Field of Search ................................ 371/10.1, 10.2, 371/10.3, 21.1, 21.2, 40.1, 40.4, 37.1; 395/575; 364/268.3

[56] References Cited

U.S. PATENT DOCUMENTS

| Re. 34,100 | 10/1992 | Hartness | 371/40.1 |
|---|---|---|---|
| 4,775,978 | 10/1988 | Hartness | 371/38 |
| 5,166,939 | 11/1992 | Jaffe et al. | 371/40.1 |
| 5,233,618 | 8/1993 | Glider et al. | 371/68.1 |
| 5,283,875 | 2/1994 | Gibson et al. | 395/425 |
| 5,287,363 | 2/1994 | Wolf et al. | 371/21.1 |

FOREIGN PATENT DOCUMENTS 62-24481   2/1987   Japan .......................... G11B 20/18

Primary Examiner—Robert W. Beausoliel, Jr.
Assistant Examiner—Albert Decady
Attorney, Agent, or Firm—Antonelli, Terry, Stout & Kraus

[57] ABSTRACT

A storage system comprises a disc drive unit including a plurality of logical drive groups each having a plurality of physical drives, and a disc drive control unit for controlling the information transfer between the disc drive unit and the host system. The logical data arriving from the host system is divided into a plurality of continuous data blocks, from which redundant data is prepared for data restoration. The redundant data is added to the continuous data blocks to provide updated logical data. The storage system is controlled in such a way as to write the updated logical data into a plurality of physical drives. In the case where a fault develops in any of the data blocks of the physical drives to be accessed, redundant data is generated from the updated logical data. The data block of the updated logical data of the physical drive corresponding to the data blocks that has not developed a fault, among the data blocks and the redundant data making up the updated logical data, is stored in the physical drive. The data block of the updated logical data of the physical drive corresponding to the data block that has developed a fault is stored in the nonvolatile memory. The completion of writing the updated logical data into the storage system is reported to the host system. In re-updating the updated logical data, the data block of the re-updated logical data corresponding to the data block of the physical drive that has developed a fault is stored in the physical drives. The data block stored in the nonvolatile memory are stored into an alternate block allocated to the physical drives.

18 Claims, 7 Drawing Sheets

FIG. 4

REDUNDANCY TABLE

| 401 | 402 | 400 |
|---|---|---|
| LOGICAL DRIVE NUMBER | REDUNDANCY | |

FIG. 5

PHYSICAL DRIVE CONFIGURATION TABLE

| 411 | 412 | 410 |
|---|---|---|
| LOGICAL DRIVE ADDRESS INFORMATION | PHYSICAL DRIVE NUMBERS | |

FIG. 6

NONVOLATILE MEMORY MANAGEMENT TABLE

| LOGICAL DRIVE ADDRESS INFORMATION (421) | PHYSICAL DRIVE ADDRESS INFORMATION (422) | NONVOLATILE MEMORY POINTER (423) |
|---|---|---|
| | | |
| ⋮ | ⋮ | ⋮ |
| | | |

ALTERNATE BLOCK MANAGEMENT TABLE

| NUMBER OF REMAINING ALTERNATE BLOCKS (431) | REMAINING ALTERNATE BLOCK ADDRESS INFORMATION (432) |
|---|---|
| | |
| ⋮ | ⋮ |
| | |

(430)

FAULTY BLOCK MANAGEMENT TABLE

| LOGICAL DRIVE ADDRESS INFORMATION (441) | NUMBER OF FAULTS IN LOGICAL DATA (442) |
|---|---|
| ⋮ | ⋮ |

440

USER INSTRUCTION INFORMATION

| PERFORMANCE INFORMATION (451) | RELIABILITY INFORMATION (452) |
|---|---|
| ⋮ | ⋮ |

450

STORAGE SYSTEM AND METHOD OF CONTROL

BACKGROUND OF THE INVENTION

The present invention relates to a storage technique for computer systems, or more in particular to a technique effectively applied to the disc array or the like for performing parallel read and write operations of data with a plurality of disc drives or disk drivers.

In the field of information processing, the information processing speed of the central processing unit of the computer has remarkably increased by use of the semiconductor techniques. In contrast, a great improvement in the operating performance including the data transfer speed of external storage units such as a magnetic disc unit is difficult to achieve due to the basic limitations in operation imposed by the need of mechanical operations.

For example, JP-A-62-24481 which claims the priority right on the basis of U.S. Patent Application Serial No. 06/732353 now abandoned filed on May 8, 1986 by Thinking Machine Corporation, proposes a disc array technique. The storage control technique disclosed in this publication is described below.

Logical data arriving from a host system such as a central processing unit is divided into a plurality of data blocks. A plurality of parity data blocks (redundant data blocks) are attached to the resulting data blocks. Each of the data blocks is written (updated) or read in parallel into a plurality of physical drives thereby to improve the data transfer speed.

In this case, in order to increase the speed of access to the data blocks and parity data blocks making up the logical data, the physical drives are often rotated synchronously. In the case where any of the data blocks making up the logical data develops a fault, the data blocks and the parity blocks other than the faulty data block are accessed concurrently by synchronous rotation, and the faulty data block is restored and transferred "on the fly", thereby realizing a high-speed data transfer.

Although the above-mentioned publication describes no method of restoring the data of the faulty data block, reliability is maintained by providing an alternate block replacing the faulty data block in an exclusive alternate block track according to a general SLED (Single Large Extensive Disk) unit.

According to the above-mentioned publication, the process for restoration of a faulty data block is performed in the following steps:

(1) The faulty data block is allocated to an exclusive alternate block track or an alternate area in the same track.

(2) The data blocks other than the fault data block and the redundant data block for restoration of the faulty data are read out of a physical drive.

(3) The faulty data block is restored by the data blocks except for the faulty one and the redundant data block.

(4) The data block thus restored is stored in the alternate block.

The technique using this method poses the following problem:

Assume that the redundancy of the logical data including the faulty data block is 1 (there is one parity data block in the logical data, and the number of the faulty data blocks capable of being restored is one). In the case where another data block becomes faulty before a restored data block is generated from the redundant data block and the non-faulty data blocks and the restored data is written into an alternate block, then there are two faulty data blocks. Data cannot be restored for the logical data having a redundancy of 1 in the presence of two faults, and the logical data is thus lost.

The data restoration processing remains the same regardless of the risk of data loss determined by the redundancy of the logical data including the faulty data block and the number of faulty data blocks. Therefore, the reliability of the logical data is varied, thereby deteriorating the reliability of the storage system as a subsystem of the computer system. Let us consider the competition between the data restoration processing and the normal data update processing. According to the above-mentioned prior art, the update processing for the host system is ended by storing the data blocks other than the faulty data block and the redundant data block added to the logical data in the physical drive. As subsequent data restoration processing, the redundant data block and the data blocks other than the faulty data block are read from the corresponding physical drives and are restored as data. After restoration, the restored data block is stored in an alternate block. In view of the fact that a plurality of physical drives are occupied for restoration processing, the normal data transfer becomes impossible in the storage system during the process, resulting in a deteriorated performance as a subsystem.

High-speed transfer is realized, on the other hand, by making a plurality of data blocks constituting a logical data access concurrently to the physical drives. Since the physical position of the data blocks making up the logical data is displaced by allocation of an alternate block, access time (head positioning time) is varied, thereby leading to a deteriorated performance. Further, in the case where an alternate block is allocated indefinitely to an alternate block area each time of generation of a faulty data block, allocation to a separate track or a separate cylinder occurs, with the result that access time is varied even more and the performance of the system as a subsystem is deteriorated.

SUMMARY OF THE INVENTION

The object of the present invention is to provide a control method and a storage system capable of positively preventing the data loss due to double faults which may occur during the processing of restoring a data fault.

Another object of the present invention is to provide a control method and a storage system capable of preventing the deterioration of data transfer performance with the host system at the time of the data fault restoration processing.

Still another object of the present invention is to provide a control method and a storage system capable of preventing the deterioration of access performance caused by the allocation of an alternate block.

The above and other objects, features and advantages will be made apparent by the detailed description taken in conjunction with the accompanying drawings.

A typical embodiment of the present invention will be briefly explained.

Specifically, according to a storage system of the present invention, a nonvolatile memory is inserted in a part of a disc drive control unit interposed between a disc drive unit and a host system. In the storage system, the data block updated for the faulty data block generated at the time of writing logical data into a disc drive is stored in the nonvolatile memory. The update processing for the logical data before the restoration processing for the physical drive of the updated data block is performed on the nonvolatile memory for the updated data corresponding to the faulty data block. In the absence of the updated data block in the nonvolatile memory, the updated data is stored into the nonvolatile memory during the processing.

The faulty data block generated during the reading of logical data from the disc drive is restored by other data blocks and the redundant data block and stored in the nonvolatile memory. In the case where a read demand for the logical data is generated before the data restoration processing for storing the restored data block on the nonvolatile memory into the physical drive, the restored faulty data block stored in the nonvolatile memory, other sound data blocks read from the physical drive and the redundant data block are transferred to the host system. In the absence of a data block restored from the faulty data block on the nonvolatile memory, the data block restored during the read processing is stored in the nonvolatile memory.

Decision as to whether a faulty data block is to be stored in the nonvolatile memory at the time of generation of such a faulty data block is made by comparing the redundancy of the logical data with the number of the faulty data blocks or in accordance with the user instruction.

Also, at the time point when the allocation of an alternate block in the physical drive is completed, the operation of writing out the restored data block from the nonvolatile memory into the particular alternate block.

Further, the allocation of an alternate block to the faulty data block is limited in accordance with the user instruction or automatically, so that in the case where additional faulty data blocks occur, the particular physical drive is closed, thereby urging the drive to be exchanged.

In the case where a faulty data block occurs in a part of the logical data during data transfer from the host system, the data block restored from the particular faulty data block is stored in the nonvolatile memory. Even if the redundancy of the logical data is 1 when a fault occurs in other data blocks of the logical data during the time of data restoration by storing the data of the faulty data block in the physical drive, the restored data block exists in the nonvolatile memory. Therefore, the number of the faulty data block is 1, and the logical data can be restored, thereby positively preventing the data from being lost at the time of generation of multiple faults.

In the case where decision is made to execute storage in a nonvolatile memory by comparing the redundancy of the logical data with the number of faulty data blocks and by confirming that they are equal to each other, i.e., when the data is liable to be lost if more faulty data blocks occur in the same logical data, the risk of data loss is equalized in the storage system, thereby improving the reliability.

When the user instruction demands a high reliability of the logical data file, the restored data block is stored in the nonvolatile memory, thus making it possible to meet the reliability requirement for each logical data file.

In the process of storing data in the physical block after allocation of an alternate block, the only step required is to write the restored data block in the nonvolatile memory into one corresponding physical drive. The storage system thus can provide services to the host system without occupying other physical drives for the restoration processing, thus improving the performance of the storage system.

In the case where a new access demand is generated against the logical data of which the faulty data block is not stored in the nonvolatile memory at the time of fault generation, the updated data for the particular faulty data block or the restored data block after a read operation is stored in the nonvolatile memory. As a consequence, the processing of data storage in the physical drive after allocation of an alternate block is completed by writing into a single physical drive in similar fashion, and therefore the performance is improved without competing with normal input/output processing.

Furthermore, to the extent that the allocation of an alternate block is limited in the physical drive, the required access time to the logical data of each physical drive is prevented from extending beyond a predetermined length, thereby preventing the performance from being deteriorated due to an increase in the required access time.

Also, by permitting the setting of the abovementioned limitation arbitrarily in accordance with the user instruction, the data restoration processing not degraded below the critical performance required of each logical data file is realized.

BRIEF DESCRIPTION OF THE DRAWINGS

FIG. 4 is a schematic diagram showing an example of a redundancy table used for a storage system according to an embodiment of the present invention.

FIG. 5 is a schematic diagram showing an example of a physical drive configuration table used for a storage system according to an embodiment of the present invention.

FIG. 6 is a schematic diagram showing an example of a nonvolatile memory management table used for a storage system according to an embodiment of the present invention.

FIG. 7 is a schematic diagram showing an example of an alternate block management table used for a storage system according to an embodiment of the present invention.

DESCRIPTION OF THE PREFERRED EMBODIMENTS

A storage system according to an embodiment of the present invention will be explained in detail below with reference to the accompanying drawings. Reference will be had to a disc array system providing an external storage system built in a computer system as an example of storage system.

Figures 8, 9, 10:
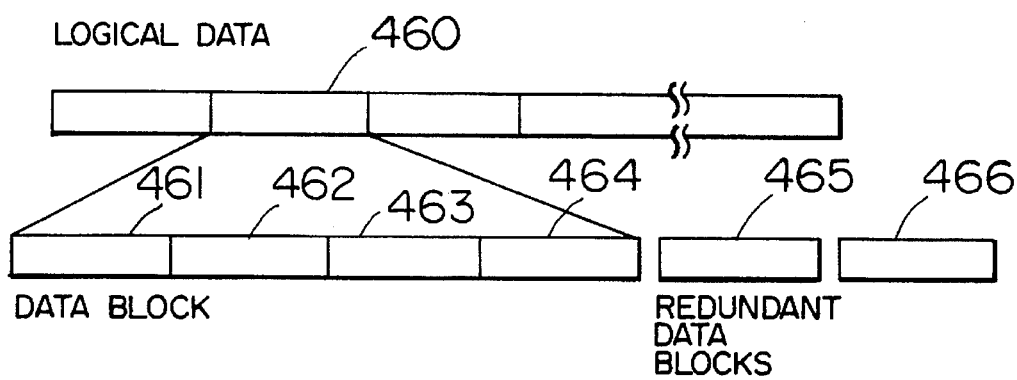
FIG. 8 is a schematic diagram showing an example of a faulty block management table used for a storage system according to an embodiment of the present invention.
FIG. 9 is a schematic diagram showing an example of the user instruction information used for a storage system according to an embodiment of the present invention.
FIG. 10 is a schematic diagram showing an example of the format of the logical data used for a storage system according to an embodiment of the present invention.
Figure 11:
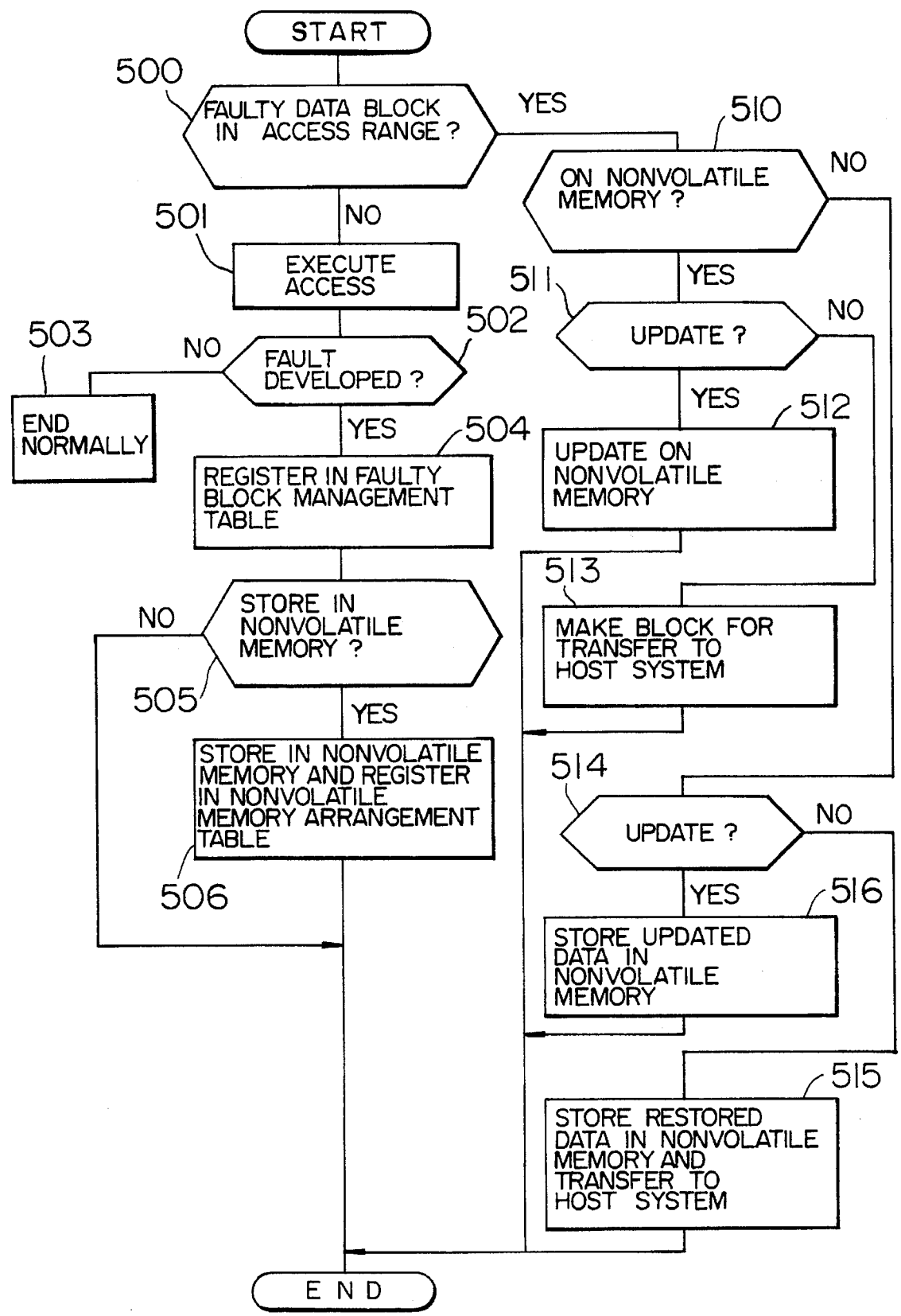
FIG. 11 is a flowchart showing an example of operation of a storage system according to an embodiment of the present invention.

FIG. 10 is a schematic diagram showing an example of the format of the logical data used in the present embodiment.

A logical data 460 is divided into four physical data blocks (hereinafter referred to simply as "the data blocks") 461 to 464. Further, two redundant data blocks 465, 466 are added. Data are transferred in parallel to the six physical drives making up the logical drives respectively.

Figure 1:
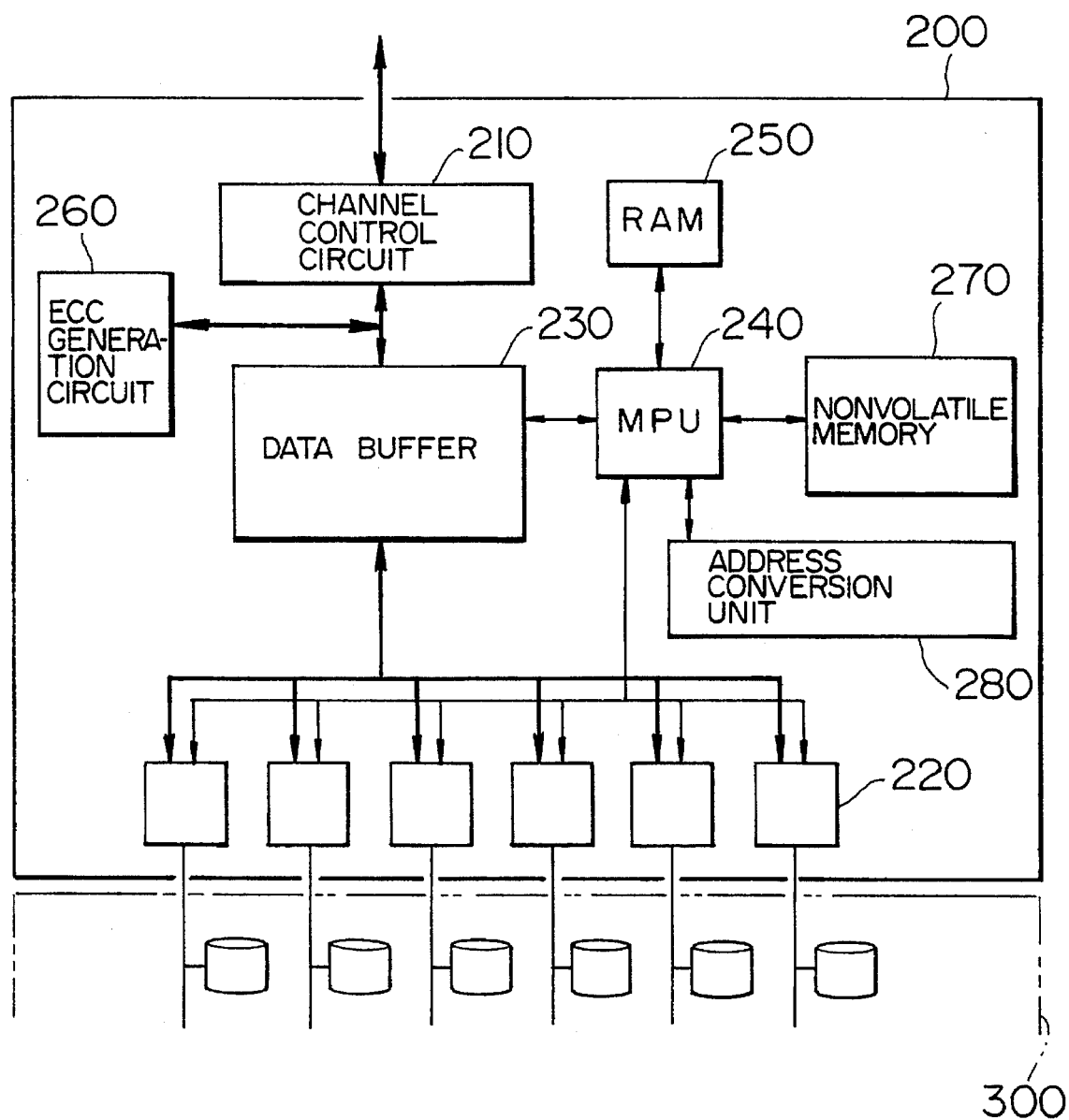
FIG. 1 is a schematic diagram showing in detail a part of a storage system according to an embodiment of the present invention.
Figure 2:
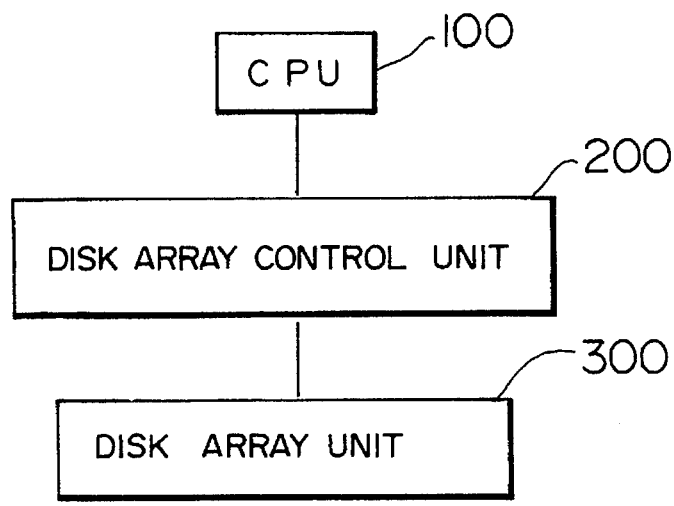
FIG. 2 is a block diagram showing an example of a computer system including a storage system according to an embodiment of the present invention.

FIG. 2 is a block diagram showing an example of the configuration of a computer system including a storage system according to the present embodiment, and FIG. 1 a schematic diagram showing a part of the storage system in detail according to the present embodiment.

As illustrated in FIG. 2, the computer system according to the present embodiment comprises a central processing unit (CPU) 100, a disc array unit 300 and a disc array control unit 200 for controlling the exchange of information between the CPU 100 and the disc array unit 300.

An example of the internal configuration of the disc array control unit 200 is shown in FIG. 1.

In FIG. 1, a microprocessor unit (MPU) 240 executes while sequentially decoding the control program stored in a random access memory (RAM), and thus controls the whole of the disc array control unit 200. The random access memory 250 has stored therein a redundancy table 400, a physical drive configuration table 410, a non-volatile memory management table 420, an alternate block management table 430, a faulty block management table 440 and user instruction information 450 as described later.

A channel control circuit 210 is for controlling data transfer with the central processing unit 100. A drive control circuit 220 controls data transfer with each physical drive making up the disc array control unit 200. A data buffer 230 is interposed between the channel control circuit 210 and the drive control circuit 220 for temporarily holding the data exchanged between the channel control circuit 210 and the drive control circuit 220. An ECC generation circuit 260 is for adding redundant data blocks to the logical data arriving from the central processing unit 100 on the one hand and restoring the faulty data block on the basis of non-faulty data blocks and the redundant data blocks.

A nonvolatile memory 270 is included in a part of the disc array control unit 200. When data is written into or read from the disc array control unit 200 by the central processing unit 100, the updated data block that could not be written into the disc array control unit 200 due to a fault, together with the faulty data block that could not be read from the disc array control unit 200 and is restored at the ECC generation circuit 260 as a restored data block, is stored on the basis of the decision logic described later.

An address conversion mechanism 280 is for converting the logic drive number and the logic data address designated by the central processing unit 100 into a physical drive number and a physical data address respectively in making access to the disc array unit 300.

Figure 3:
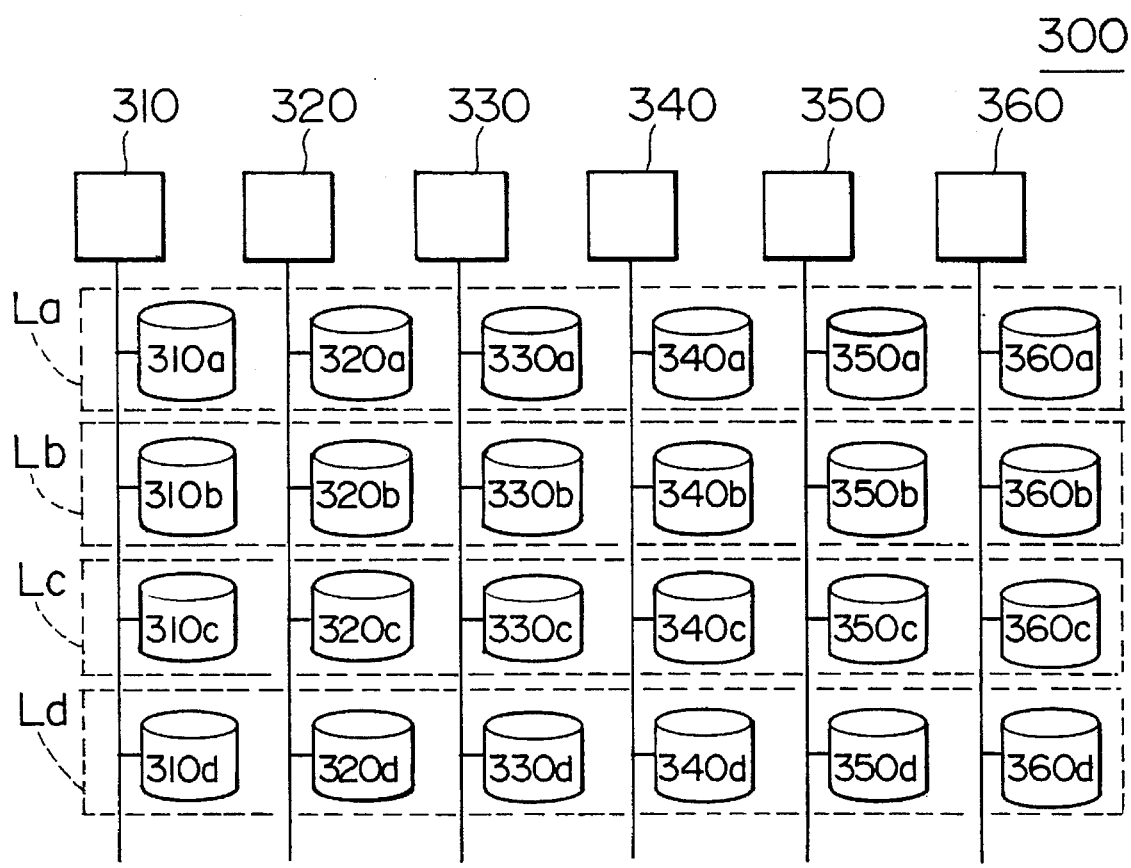
FIG. 3 is a schematic diagram showing an example of drive configuration of a disc array system making up a storage system according to an embodiment of the present invention.

FIG. 3 is a schematic diagram showing an example of the drive configuration in the disc array unit 300.

Data transfer control circuits 310 to 360 are for performing data transfer with each drive control circuit 220 of the disc array control unit 200. Each of the data transfer control units 310 to 360 is connected with four physical drives 310a to 310d, physical drives 320a to 320d, physical drives 330a to 330d, physical drives 340a to 340d, physical drives 350a to 350d and physical drives 360a to 360d, respectively. According to the embodiment under consideration, the drives under the control of the data transfer control circuits 310, 320, 330, 340 are allocated as a data storage drive, and the drives under the control of the data transfer control circuits 350, 360 as a redundant data drive. Also, these drives constitute four sets of logical drive groups (hereinafter referred to as "the logical drives") including physical drives 310a to 360a, physical drives 310b to 360b, physical drives 310c to 360c, and physical drives 310d to 360d. The data restoration group (a unit for adding a redundant data) is also configured in similar fashion. The logical drives will hereinafter be referred as a logical drive La, logical drive Lb, logical drive Lc and a logical drive Ld in the order of increasing distance from the data transfer control circuits 310 to 360.

The above-mentioned tables constituted in the random access memory 250 according to the present embodiment will be explained with reference to FIGS. 4 to 9.

The redundancy table 400 shown in FIG. 4 represents the number of redundant drives for each logical drive, in which logical drive numbers are arranged in opposition to the redundancy 402 in the respective logical drives.

The physical drive configuration table 410 shown in FIG. 5 shows which physical drive constitutes each logical drive, and has stored therein logical drive address information 411 in correspondence with the physical drive numbers 412 making up the respective logical drives. Information indicating whether the particular physical drive is usable on-line or unusable in closed state for each physical drive is also stored.

A nonvolatile memory management table 420 shown in FIG. 6 is for storing the address information of the data blocks stored in the nonvolatile memory 270 and the storage position information in the nonvolatile memory 270 storing the data blocks in correspondence with each other. The nonvolatile memory management table 420 includes logic drive address information 421, physical drive address information 422 and a nonvolatile memory pointer 423.

An alternate block management table 430 shown in FIG. 7 indicates the number of alternate blocks existing for each track and cylinder of the physical drives and the alternate block address information, and holds the number of remaining alternate blocks 431 and the remaining alternate block address information 432 for each cylinder and track number of the physical drives.

A faulty block management table 440 shown in FIG. 8 shows the number of data blocks constituting a fault in each logical data, and is comprised of logical drive address information 441 and the number of faults in the particular logical data 442.

The user instruction information shown in FIG. 9 represents the degree of performance and reliability of each logical drive demanded by the user, and is comprised of performance information 451 and reliability information 452 for each logical drive.

According to the present embodiment, the microprocessor unit 240 in the disc array control unit 200 executes optimum data restoration for the faulty data block by reference to the redundancy table 420, the physical drive configuration table 410, the nonvolatile memory management table 420, the alternate block management table 430, the faulty block management table 440, the user instruction information 450, etc.

Now, explanation will be made about an example of the operation performed on a data transfer demand occurring from the central processing unit 100 against the disc array control unit 200.

First, step 500 checks to make sure whether a faulty data block already exists in the access range. With the logical drive number and the address intended for access as a key, the logical drive address information 441 in the faulty block management table 440 is searched. In the case where there exists a logical drive address of the same logical drive, it is decided that a faulty data block exists in the access range. As a result, in the presence of a faulty data block, the process proceeds to step 510, while in the absence of such a data, the process is passed to step 501. Steps 501 and subsequent steps will be explained first.

Step 501 first converts a logical drive address into a physical drive address at the drive conversion mechanism 280 and actually executes the data transfer from the central processing unit 100. In the process, the address conversion mechanism 280 refers to the physical drive configuration table 410.

Then, whether or not a faulty data block has been generated is decided at step 502, and in the absence of any fault, the process proceeds to step 503, thus normally ending the whole process.

In the case where step 502 decides that a faulty data block has occurred, on the other hand, the process is passed to step 504 and the fault information is registered in the faulty block management table 440. This processing is such that in the case where the data address and the logical drive number associated with the fault generated is not existent in the logical drive address information 441, the particular drive number and the data address are registered anew, and 1 is added to the corresponding number of faults in the logical data 442. This process corresponds to the operation performed at the time of generation of a new fault at the data block 462 with the data block 461 already registered as a faulty data block in the logical data 460.

Now, step 505 decides whether the particular faulty data block is to be stored in the nonvolatile memory 270. The particular faulty data block may be stored in the nonvolatile memory 270 unconditionally, or the decision may be made according to the degree of risk of data loss or user instruction. According to the embodiment under consideration, the data is stored in the nonvolatile memory 270 regardless of the user instruction when the risk of data loss is high. When the degree of risk is low, by contrast, the data is stored in the nonvolatile memory 270 regarding the faulty data block of the logical drive of which high reliability is highly demanded according to the user instruction. The logical data address and the logical drive number containing the particular faulty data block are determined from the logical drive address information 441 with reference to the faulty block management table 440. The number of faulty data blocks in the particular logical data is determined from the number 442 of faults in the logical table. Further, the redundancy of the logical drive is determined from the corresponding redundancy 402 by searching the logical drive number 401 in the redundancy table 400. These two pieces of information are compared with each other, and when they are equal to each other, i.e., when the faulty data block has been generated to the limit of data restoration, it is decided that the degree of risk of data loss is high. It is decided that the risk of data loss is low, on the other hand, when the number of faults in the logical data is smaller than the redundancy, i.e., when data restoration is possible in spite of generation of a faulty data block in the same logical data. In the process, the user instruction to the logical drive is decided with reference to the reliability information 452 of the user instruction information 450. In the case where the user instruction is to increase the reliability of the logical drive according to the reliability information, the data is stored in the nonvolatile memory 270.

In the case where the data is to be stored in the nonvolatile memory 270 as a result of decision at step 505, the process proceeds to step 506. Otherwise, the data transfer processing from the central processing unit 100 is ended. With regard to the particular faulty data block, step 506 stores the updated data block at the time of update (in data write operation), and a data block restored by a redundant data block and the remaining sound data block in data read operation, respectively, in the nonvolatile memory 270. Also, in the nonvolatile memory management table 420, the logical address of the particular faulty data block is set at the logical drive address information 421, the physical address information at the physical drive address information 422, and the address information of the nonvolatile memory 270 at the nonvolatile memory pointer 423. After completion of this step 506, the data transfer processing from the central processing unit 100 is ended.

Now, explanation will be made about the processing performed when step 500 decides that a faulty data block exists in the access range.

First, step 510 decides whether the particular faulty data block is existent in the nonvolatile memory 270. This decision is made by searching the logical drive address information 421 in the nonvolatile memory management table 420 with the logical drive number and the logical data address of the faulty data block as a key.

In the presence of a faulty data block in the nonvolatile memory 270, the process is passed to step 511. Step 511 decides whether the particular processing demand relates to the update processing, and if so, the process proceeds to step 512. Step 512 updates the updated data block for the particular data block in the nonvolatile memory 270. This operation is realized by searching for the nonvolatile memory pointer 423 by the physical drive address information 422 in the nonvolatile memory management table 420, determining the nonvolatile memory address storing the particular faulty data block, and writing the updated data block in the area in the nonvolatile memory 270 as designated by the particular address.

When step 511 decides that the update processing is not involved, i.e., that the read processing is involved, the process is passed to step 513, where the nonvolatile memory address storing a faulty data block is determined by the same technique as at step 512, so that the information of the area designated by the particular address is read and transferred to the central processing unit 100 as an object data block.

In the case where step 510 decides that the object data block is not present in the nonvolatile memory 270, on the other hand, step 514 decides whether the update processing is involved or not. When the update processing is not involved, the process is passed to step 515, where the faulty data block is restored by the sound data blocks other than the faulty data block and the redundant data blocks. The restored faulty data block is transferred to the central processing unit 100 on the one hand and is stored in the nonvolatile memory 270 on the other hand. In the case where step 514 decides that the update processing is involved, step 516 stores the updated data block corresponding to the faulty data block in the nonvolatile memory 270. The procedure for storage in the nonvolatile memory 270 at steps 515 and 516 is similar to that of step 506.

Figure 12:
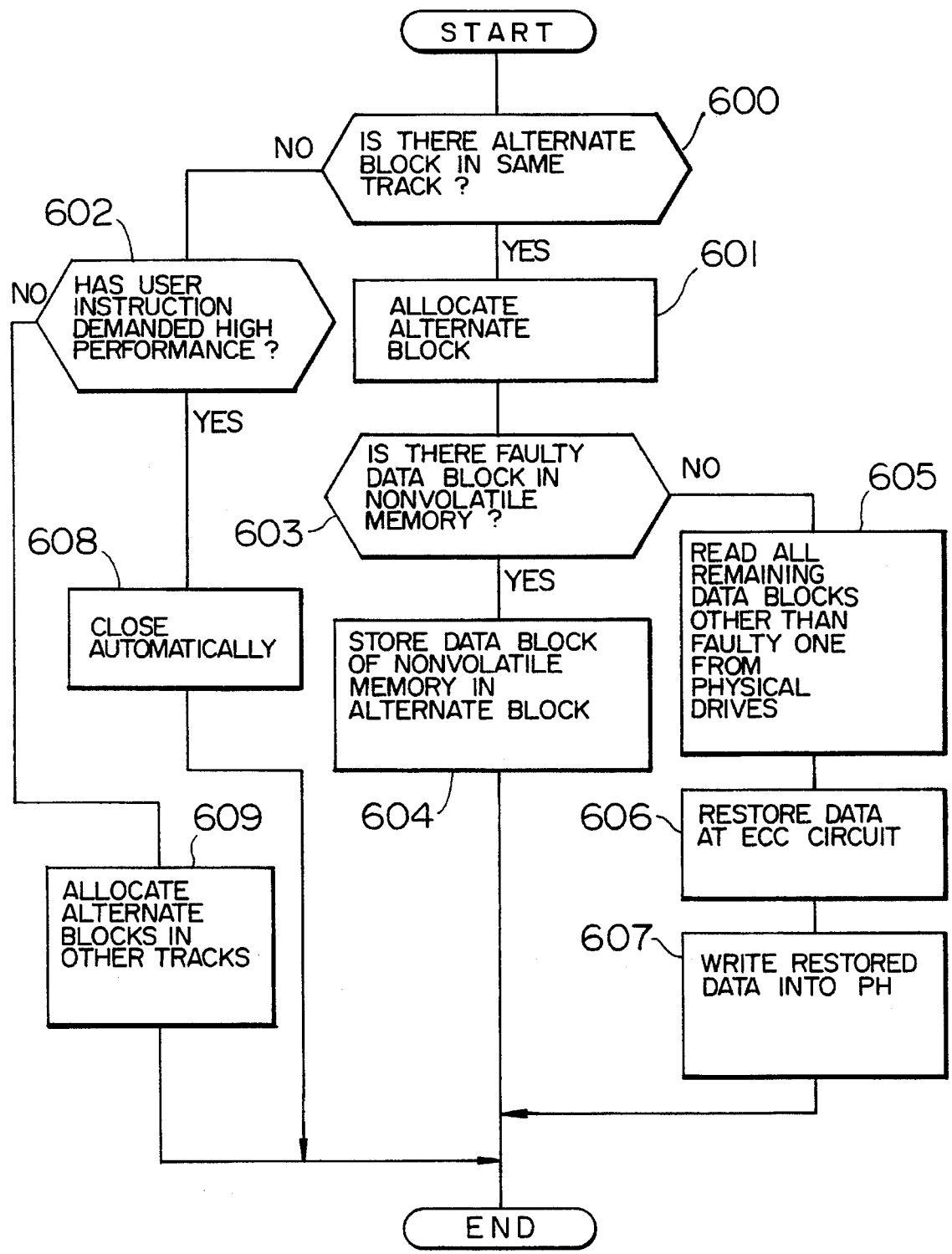
FIG. 12 is a flowchart showing another example of operation of a storage system according to an embodiment of the present invention.

An example of the processing for allocating an alternate block for data restoration will be explained with reference to the flowchart of FIG. 12.

First, step 600 decides whether or not an alternate block exists in the same track. This decision is made by determining the number 431 of alternate blocks remaining in the same track by use of the physical drive number, the cylinder number and the track number of the particular faulty data block with reference to the alternate block management table 430, and when such a value is not 0, by confirming that an alternate block still exists in the same track. In the case where an alternate block is found to be existent, the process proceeds to step 601, while the process is passed to step 602 otherwise.

Step 601 allocates an alternate block. This operation is performed by deleting address information and subtracting one from the number 431 of remaining alternate blocks in order to allocate one of the remaining alternate block address information 432 in the alternate block management table 430 as an alternate block for the particular faulty data block. The alternate block allocation information thus obtained may be stored in each physical drive by issuing an instruction to the physical drive or may be stored in the data transfer control circuit. According to the present embodiment, the physical drive is used for storage.

Next, step 603 decides whether or not there exists a faulty data block (or an updated data block or a restored data block corresponding thereto) on the nonvolatile memory 270. In the case where it is decided that such a faulty data block exists on the nonvolatile memory 270, the process is passed to step 604. Step 604 writes an updated data block or a restored data block for the particular faulty data block in the nonvolatile memory 270 into an alternate block of the physical drive. Assuming that the physical drive into which such blocks are intended to be written is 320a shown in FIG. 3, for example, the other physical drives 320b to 320d under the control of the data transfer control circuit 320 are inaccessible, whereas the physical drives under the control of the other data transfer control circuits 310, 330, 340, 350, 360 are accessible.

The process is returned to step 603, and when no faulty data block is found to be present on the nonvolatile memory 270, the process is passed to step 605. At step 605, the data other than the particular faulty data block are read into the data buffer 230. The data blocks 461 to 464 and the redundant data blocks 465, 466 of the logical data 460, for example, are stored in the physical drives 310a to 360a making up the logical drive La respectively. When the data block 462 becomes a faulty data block, the data blocks 461, 463, 464 and the redundant data blocks 465, 466 are read from the physical drives 310a, 330a, 340a, 350a, 360a respectively and are stored into the data buffer 230. After that, step 606 restores the faulty data block. This restoring operation is performed in such a manner that the ECC generation circuit 260 generates a data block 462 on the basis of the redundant blocks 465, 466 and the data blocks 461, 463, 464 stored in the data buffer 230, and the data block thus generated is stored in the data buffer 230. Further, step 607 stores the restored data block 462 into the alternate block of the physical drive 320a, thereby completing the data restoration processing.

Steps 605, 606, 607 concern the prior art. In executing the processing of these steps, the physical drive under the control of the data transfer control circuit 320 corresponding to the faulty data block 462 is accessible from the central processing unit 100, whereas the physical drives under the control of the data transfer control circuits 310, 330, 340, 350, 360 are inaccessible as they are occupied for data transfer processing for data restoration.

In contrast, according to the present embodiment, the restored data block for the faulty data block is held in the nonvolatile memory 270. Therefore, as at step 604, only the physical drive (the physical drive 320a in the case under consideration) intended for storage to write the restored data block is occupied. The other physical drives are thus ready to meet the normal input/output processing demand. More specifically, competition between data restoration processing and normal input/output processing is reduced, thereby preventing the performance deterioration of normal input/output processing. Also, in order to realize step 604, the logic for storing data into the nonvolatile memory 270 is required at steps 506, 516, 517. These processings not only improve the performance and reduce the risk of data loss, but also realize the data restoration processing based on the reliability required of a file, thus leading an improved system reliability.

Then, the process returns to step 600, where if there is found no alternate block area in the same track, the process is passed to step 602. In the process, the particular physical drive may be closed automatically or in accordance with the user instruction. According to the present embodiment, the operation is performed in compliance with the user instruction. In the case where the performance demand is set for each logical drive by the user in advance, step 602 decides whether the particular physical drive should be closed or not. When a high performance is required by the performance information 451 of the user instruction information 450 to the logical drive containing the particular physical drive, the process proceeds to step 608, while the process is passed to step 609 in the other case.

Step 608 automatically closes the particular physical drive. This closing operation is performed by deleting the particular physical drive from the physical drive numbers 412 of the physical drive configuration table 410 while at the same time subtracting one from the redundancy 402 of the physical drive in the redundancy table 400. After the physical drive is automatically closed, the faulty drive is replaced, so that sound data blocks and redundant data blocks making up each logical data are read from physical drives other than those replaced in the logical drive. The data block to be stored in the physical drive thus replaced is restored and sequentially written into the physical drive thereby to restore the data of the physical drive that has been replaced. The data restoration processing at the physical drive thus replaced may be performed from time to time according to the user instruction, or may be executed between normal input/output processings. After restoration, all the logical data including the data blocks stored in the particular physical drive are physically in the same position for lack of an alternate block, thus realizing a high-speed data transfer taking advantage of the synchronous operation of physical drives making up the logical drive. In the case where a high performance of the logical drive is not demanded from the user, step 609 allocates an alternate block area in other tracks with reference to the alternate block management table 430. In the process, 1 is subtracted from the number 431 of remaining alternate blocks allocated and is deleted from the remaining block address information 432.

In this way, steps 602, 608 prevent an alternate block from being allocated to other tracks automatically or in accordance with the user instruction. It is thus possible to prevent an increased access time which is attributable to the fact that a faulty data block included in the data blocks or redundant data blocks making up the same logic data is stored at a position physically distant from other data blocks. The data access speed of physical drives, i.e., the performances such as data transfer speed can thus be maintained at a predetermined level.

The invention developed by the present inventors has been specifically described above with reference to embodiments. It should be understood that the present invention is not limited to the abovedescribed embodiments but can be modified in various ways to the extent not departing from the spirit thereof.

The effects obtained from typical embodiments of the present invention disclosed above will be described.

Specifically, according to a storage system of the present invention, a restored faulty data block is stored in a nonvolatile memory, where by the data loss due to double faults during the data restoration processing is prevented.

Further, the restoration of a faulty data block is possible merely by the operation in which only a restored faulty data block stored in a nonvolatile memory is held in a specified physical drive. It is therefore not necessary to read sound data blocks of other physical drives, thereby minimizing the performance deterioration of normal input/output processing in the restoration operation.

Furthermore, the allocation of an alternate block is limited in accordance with the performance requirement set in each logical drive. As a result, the performance such as data transfer speed of each logical drive can be maintained at a predetermined level.

We claim:

1. In a storage system comprising a disc drive unit including a plurality of logical drive groups each having a plurality of physical drives and a disc drive control unit for controlling the transfer of information between said disc drive unit and a host system, a method for controlling said storage system by dividing the logical data transferred thereto from said host system into a plurality of continuous data blocks, generating redundant data for data restoration from said data blocks, adding said redundant data to said continuous data blocks as updated logical data, and writing said updated logical data in said physical drives, comprising the steps of:

in the case where a fault develops in any of the data blocks of said physical drive to be accessed, generating redundant data from said updated logical data and storing in said physical drive the data block of said updated logical data corresponding to the data block of said physical drive lacking said fault among the redundant data and the data blocks making up said updated logical data;

deciding as to whether the data block of said updated logical data of said physical drive corresponding to the data block that has developed the fault is storm in a nonvolatile memory, said decision being made on the basis of the degree of risk of loss of the logical data determined by the number of the faulty data blocks and the number of the redundant data blocks in the logical data;

storing in said nonvolatile memory the data block of said updated logical data of said physical drive corresponding to the data block that has developed the fault:

reporting to said host system the completion of writing the updated logical data into said storage system:

in the case of re-updating the updated logical data, updating the data block stored in said nonvolatile memory by the data block of said re-updated logical data corresponding to the data block of said physical drive that has developed said fault, and storing in said physical drive the data block of said re-updated logical data corresponding to the data block of said physical drive that has not developed a fault; and storing said data block in said nonvolatile memory into an alternate block allocated to said physical drive.

2. A method of control according to claim 1, wherein in said deciding step, the decision is made on a basis of a degree of risk of loss of the logical data determined by a number of faulty data blocks and a number of redundant data blocks in the logical data, and wherein the data block of said updated logical data corresponding to the data block that has developed a fault is stored in said nonvolatile memory when said degree of risk assumes a predetermined value.

3. A method of control according to claim 1, wherein in said deciding step, a decision is made in accordance with a user program operated in said host system.

4. A method of control according to claim 1, wherein in said deciding step, a decision is made on a basis of an operator.

5. A method of control according to claim 1, wherein even in the case where the degree of risk of data loss determined by the number of faulty data blocks and the number of redundant data blocks in said logical data is smaller than a predetermined value, the data block of said updated logical data corresponding to the data block that has developed a fault is left stored in said nonvolatile memory to the extent that a demand for re-updating of said updated logical data is issued by said host system during the period from the generation of the fault to the restoration of the fault.

6. A method of control according to claim 1, wherein said physical drive includes a disc-type recording medium having a recording track, said method of control further comprises a step for deciding whether said physical drive is to be closed when said alternate block is allocated to said physical drive, and wherein in said deciding step, in a case where an entire region for an alternate block allocated in a given track has been allocated to a faulty data block, said physical drive is closed with reference to a management table for managing the allocation of said alternate block in the track of said physical drive.

7. A method of control according to claim 1, wherein, said method of control further comprises a step for deciding whether said physical drive is to be closed when said alternate block is allocated to said physical drive, and wherein in said deciding step the decision is made in accordance with the user program operated in said host system.

8. A method of control according to claim 1, wherein said method of control further comprises a step for deciding whether said physical drive is to be closed when said alternate block is allocated to said physical drive, and wherein in said deciding step the decision is made by an operator.

9. In a storage system comprising a disc drive unit including a plurality of logical drive groups each having a plurality of physical drives, a disc drive control unit for controlling information transfer between said disc drive unit and a host system, and means for storing in said physical drives the logical data having a plurality of continuous data blocks and redundant data for data restoration prepared from said data blocks, a method of controlling the storage system by reading the logical data from said physical drives and transferring said logical data to said host system, comprising the steps of:

in the case where a faulty data block develops in any of the data blocks of said physical drives storing said logical data to be read, restoring to the original data the faulty data block on the basis of the data blocks and said redundant data making up said logical data other than said faulty data block;

deciding as to whether the data block of said updated logical data of said physical drive corresponding to the data block that has developed the fault is stored in a nonvolatile memory, said decision being made on the basis of the degree of risk of loss of the logical data determined by the number of the faulty data blocks and the number of the redundant data blocks in the logical data;

transferring the restored data block to said host system and storing said restored data block in a nonvolatile memory at the same time;

when said logical data is read again, reading the restored data block from said nonvolatiles memory as the faulty data block of said logical data, reading from said physical drive the data block of said logical data other than said faulty data, and transferring both of said data to said host system; and storing the restored data block stored in said nonvolatile memory into an alternate dock allocated to said physical drive.

10. A method of control according to claim 9, wherein in said deciding step, the decision is made on a basis of a degree of risk of loss of the logical data determined by a number of faulty data blocks and a number of redundant data blocks in the logical data, and said restored data block being stored in said nonvolatile memory when said degree of risk assumes a predetermined value.

11. A method of control according to claim 9, wherein in said deciding step, a decision is made in accordance with a user program operated in said host system.

12. A method of control according to claim 9, wherein in said deciding step, a decision is made on a basis of an operator.

13. A method of control according to claim 9, wherein even in the case where the degree of risk of loss of the logical data determined by the number of faulty data blocks and the number of redundant data blocks in the logical data is smaller than a predetermined value, the restored data block as said faulty data block is stored in said nonvolatile memory to the extent that a demand for reading said logical data is issued from said host system during the period from the generation of said fault to the restoration of said fault.

14. A method of control according to claim 9, wherein said physical drive includes a disc-type recording medium having a recording track, said method of control further comprises a step for deciding whether said physical drive is to be closed when said alternate block is allocated to said physical drive, and wherein in said deciding step, in a case where an entire region for an alternate block allocated in a given track has been allocated to a faulty data block, said physical drive is closed with reference to a management table for managing the allocation of said alternate block in the track of said physical drive.

15. A method of control according to claim 14, wherein said method of control further comprises a step for deciding whether said physical drive is to be closed when said alternate block is allocated to said physical drive, and wherein in said deciding step the decision is made in accordance with the user program operated in said host system.

16. A method of control according to claim 14, wherein said method of control further comprises a step for deciding whether said physical drive is to be closed when said alternate block is allocated to said physical drive, and wherein in said deciding step the decision is made by an operator.

17. A storage system comprising:

a disc drive unit including a plurality of logical drive groups each having a plurality of physical drives;

means, interposed between said disc drive unit and an external host system, for controlling said storage system in such a manner that the logical data transferred thereto from said host system is divided into a plurality of continuous data blocks, redundant data for data restoration is prepared from the data blocks and added to the continuous data blocks as updated logical data, and said updated logical data is written into the physical drives;

means for generating redundant data from said updated logical data in the case where a fault has developed in any of the data blocks of said physical drive to be accessed;

a decider for making a decision as to whether the data block of said updated logical data of said physical drive corresponding to the data block that has developed the fault is stored in a nonvolatile memory, said decision being made on the basis of the degree of risk of loss of the logical data determined by the number of the faulty data blocks and the number of the redundant data blocks in the logical data;

write means for storing into said physical drive the data block of the updated logical data corresponding to the data block of said physical drive that has not developed a fault, of all the redundant data and the data blocks making up said updated logical data;

a nonvolatile memory for storing the data block of said updated logical data of said physical drive corresponding to the data block that has developed a fault;

means for reporting to the host system the completion of the operation of writing said updated logical data into said storage system;

update means operated in such a manner that in re-updating the updated logical data, the data block of the re-updated logical data stored in the nonvolatile memory corresponding to the data block of said physical drive that has developed the fault is updated, and the data block of said re-updated logical data corresponding to the data block of the physical drive that has not developed a fault is stored in said physical drive; and means for storing the data block in said nonvolatile memory into an alternate block allocated to said physical drive.

18. A storage system comprising:

a disc drive unit including a plurality of logical drive groups each having a plurality of physical drives, said physical drives storing logical data including a plurality of continuous data blocks and redundant data for data restoration prepared from the data blocks;

a disc drive control unit interposed between the disc drive unit and an external host system for controlling the transfer of information between said host system and said disc drive unit;

a decider for making a decision as to whether the data block of said updated logical data of said physical drive corresponding to the data block that has developed a fault is stored in a nonvolatile memory, said decision being made on basis of the degree of risk of loss of the logical data determined by the number of the faulty data blocks and the number of the redundant data blocks in the logical data;

means for restoring a faulty data block into the original data from the data blocks and the redundant data making up the logical data other than the faulty data in the case where said fault has developed in any of the data blocks of the physical drives storing the logical data to be read;

means for transferring the restored data block to said host system while at the same time storing said restored data block in the nonvolatile memory;

read means for re-reading the logical data by reading out the restored data block of said nonvolatile memory as the faulty data block of said logical data, reading the data blocks other than the faulty data of the logical data from said physical drive and transferring said data blocks to said host system; and means for storing the restored data block in the nonvolatile memory into an alternate block allocated to the physical drive.

* * * * *